(12) United States Patent
Zhou et al.

(10) Patent No.: US 11,001,689 B2
(45) Date of Patent: May 11, 2021

(54) METHOD OF PREPARATION OF CARDO POLYETHERKETONE (PEK-C) STRUCTURAL FOAM MATERIAL

(71) Applicants: Jiangsu Sino-tech Polymerization New Materials Industry Technology Research Institute, Changzhou (CN); Chang Chun Institute of Applied Chemistry Chinese Academy of Sciences, Changchun (CN)

(72) Inventors: Guangyuan Zhou, Changchun (CN); Honghua Wang, Changchun (CN); Wei Li, Changzhou (CN)

(73) Assignees: JIANGSU SINC-TECH POLYMERIZATION NEW MATERIALS INDUSTRY TECHNOLOGY RESEARCH INSTITUTE, Changzhou (CN); CHANG CHUN INSTITUTE OF APPLIED CHEMISTRY CHINESE ACADEMY OF SCIENCES, Changchun (CN)

( * ) Notice: Subject to any disclaimer, the term of this patent is extended or adjusted under 35 U.S.C. 154(b) by 0 days.

(21) Appl. No.: 16/347,822

(22) PCT Filed: Dec. 2, 2016

(86) PCT No.: PCT/CN2016/108321
§ 371 (c)(1),
(2) Date: May 7, 2019

(87) PCT Pub. No.: WO2018/094763
PCT Pub. Date: May 31, 2018

(65) Prior Publication Data
US 2019/0292343 A1    Sep. 26, 2019

(30) Foreign Application Priority Data

Nov. 22, 2016   (CN) .......................... 201611024923.6

(51) Int. Cl.
*C08J 9/12*        (2006.01)
*B29C 44/02*       (2006.01)
(Continued)

(52) U.S. Cl.
CPC ............... *C08J 9/122* (2013.01); *B29B 11/12* (2013.01); *B29C 43/00* (2013.01); *B29C 43/58* (2013.01);
(Continued)

(58) Field of Classification Search
CPC ......... B29C 44/02; B29C 44/00; B29C 43/00; B29C 43/58; B29C 67/20; B29B 11/12; C08J 9/122; C08J 9/00; C08J 9/12
See application file for complete search history.

(56) References Cited

FOREIGN PATENT DOCUMENTS

| CN | 101580599 A | 11/2009 |
|---|---|---|
| CN | 102585210 A | 7/2012 |

(Continued)

OTHER PUBLICATIONS

Google Patents Translation of CN 103435831A (Year: 2020).*
Google Patent Translation of CN 102504323A (Year: 2020).*
Google Patent Translation of CN 102875800A (Year: 2020).*

*Primary Examiner* — Mathieu D Vargot
(74) *Attorney, Agent, or Firm* — Bayramoglu Law Offices LLC

(57) ABSTRACT

A method of preparation of a cardo polyetherketone structural foam material, including the following steps: 1) performing a mould pressing on a cardo polyetherketone resin by a high-temperature vulcanizing machine to prepare a foaming billet; 2) placing the foaming billet in a foaming (Continued)

cavity of a mould-pressing machine, performing a penetration and a swelling by introducing a supercritical fluid to achieve diffusion equilibrium, forming a polymer-supercritical fluid homogeneous solution, and 3) making the polymer-supercritical fluid homogeneous solution supersaturated through a sudden release of the inner pressure of the system, thereby inducing nucleation and foaming, and finally forming a structural foam having a closed pore structure with a uniform pore size and an adjustable pore density. The production process of the present invention is clean, environmentally friendly, and has relatively high efficiency. The obtained structural foam has good mechanical properties.

11 Claims, 1 Drawing Sheet

(51) Int. Cl.
*B29B 11/12* (2006.01)
*C08G 65/40* (2006.01)
*C08J 9/00* (2006.01)
*C08L 71/10* (2006.01)
*B29C 43/58* (2006.01)
*B29C 67/20* (2006.01)
*B29C 44/00* (2006.01)
*B29C 43/00* (2006.01)
*B29K 71/00* (2006.01)

(52) U.S. Cl.
CPC .............. *B29C 44/00* (2013.01); *B29C 44/02* (2013.01); *B29C 67/20* (2013.01); *C08G 65/4037* (2013.01); *C08J 9/00* (2013.01); *C08J 9/12* (2013.01); *C08L 71/10* (2013.01); *B29K 2071/00* (2013.01); *C08J 2203/06* (2013.01); *C08J 2203/08* (2013.01); *C08J 2205/044* (2013.01); *C08J 2205/052* (2013.01); *C08J 2371/10* (2013.01)

(56) References Cited

FOREIGN PATENT DOCUMENTS

| | | |
|---|---|---|
| CN | 102875800 A | 1/2013 |
| CN | 103435831 A | 12/2013 |
| WO | 2015147235 A1 | 10/2015 |

* cited by examiner

METHOD OF PREPARATION OF CARDO POLYETHERKETONE (PEK-C) STRUCTURAL FOAM MATERIAL

CROSS REFERENCE TO THE RELATED APPLICATIONS

This application is the national phase entry of International Application No. PCT/CN2016/108321, filed on Dec. 2, 2016, which is based upon and claims priority to Chinese Patent Application No. 201611024923.6, filed on Nov. 22, 2016 the entire contents of which are incorporated herein by reference.

TECHNICAL FIELD

The present invention relates to a method of preparation of a cardo polyetherketone (PEK-C) structural foam, in particular to a method for preparing a cardo polyetherketone (PEK-C) structural foam material by using a supercritical fluid mould-pressing foaming technique.

BACKGROUND

High-performance thermoplastic polyaryletherketone (PEK) has the characteristics such as good flame retardancy, radiation resistance, high level of heat resistance, excellent dielectric properties, perfect impact properties, etc. The high-performance thermoplastic PEK is obtained by high-temperature polycondensation between difluorobenzophenone and aromatic dihydric phenol, and can also be a special type of engineering plastic formed by polycondensation between aromatic dihalogen and 4,4'-dihydroxybenzophenone. The high-performance thermoplastic PEK has high thermal oxidation stability and high mechanical properties. A relatively large proportion of ring structures, such as aromatic rings and heterocycles, are introduced into the polymer main chain, increasing the thermal stability of the polymer. Polymers with a "trapezoidal", "spiral" or "sheet" structure have extremely excellent heat resistance, but the disadvantage thereof is that the processing and moulding are difficult. The PEK has the structural characteristics of these high temperature resistant polymer materials, and these structures greatly increase the glass transition temperatures and melting temperatures of the polymers. The PEK was once known as super heat-resistant polymer material, and has been successfully applied in the fields such as aerospace, electronic information, energy, food, medical, etc.

Supercritical fluid (SCF) refers to a fluid at a temperature and a pressure above its critical temperature and critical pressure. Since the viscosity and diffusion coefficient of the SCF are close to that of gas, and the density and solvation ability of the SCF are close to that of liquid, the supercritical fluid can be utilized to prepare the polymer foam material. The technologies of supercritical extrusion foaming, supercritical injection foaming, supercritical solid-state intermittent foaming, and supercritical mould-pressing foaming are formed by combining supercritical fluid technology with various polymer moulding equipment, which are collectively known as supercritical fluid foaming technology. Compared with the traditional foaming technology, the supercritical fluid foaming technology is no longer limited by the decomposition temperature of the foaming agent, which can be used not only in the foaming of the general polymer material, but also in the foaming of the special engineering plastic with higher heat resistance temperature.

The current supercritical foaming process includes a supercritical injection foaming process or a supercritical extrusion foaming process, having a high efficiency of continuous production. However, many problems still exist. For example, the processing temperature of this kind of process is higher than the melting temperature of the polymer, the polymer is required to have a relatively high melt strength, the rate of pressure reduction during the foaming process is relatively low, and the foamed product obtained generally has a large foam structure, an uneven cell size distribution, and a small expansion ratio. The supercritical solid-state intermittent foaming process generally has a relatively low saturation temperature, requires several hours or even tens of hours for saturation, and has relatively low production efficiency, which greatly limits the large-scale industrialization of the process.

Changchun Institute of Applied Chemistry, Chinese Academy of Sciences, provides a cardo polyetherketone (PEK-C) in CN 102875800 B. A phenolphthalein functional group is introduced into the main chain of the cardo polyetherketone to impart higher heat resistance to the material. However, since the development of the cardo polyetherketone, no literature has reported a related successful foaming at home and abroad. In the present invention, the supercritical mould-pressing foaming technology is used in the foaming of the cardo polyetherketone (PEK-C), overcoming the conflict of high melt strength requirements under high fluidity in the supercritical injection foaming or the supercritical extrusion foaming. The preparation of a cardo polyetherketone structural foam material with a small foam size and a high foam strength is expected to have a great effect on material weight reduction and application cost reduction.

SUMMARY

The objective of the present invention is to provide a method of preparation of a cardo polyetherketone (PEK-C) structural foam material. Under the action of supercritical mould-pressing machine, the supercritical fluid is used to penetrate and swell the cardo polyetherketone (PEK-C) billet to achieve diffusion equilibrium, forming a polymer-supercritical fluid homogeneous solution. Then, through a sudden release of the inner pressure of the system, the polymer-supercritical fluid homogeneous solution system is supersaturated, thereby forming a large number of gas nucleuses, and the dissolved gas in the polymer-supercritical fluid homogeneous solution system diffuses into the gas nucleuses to enable the continuous growth of the gas nucleuses. Finally, a structural foam having a uniform cell size and an adjustable cell density is formed.

The cardo polyetherketone (PEK-C) structural foam material prepared by the present invention can be used at a temperature above 150° C., which meets the development needs of related fields.

The above-mentioned objective of the present invention is achieved by the following technical solutions. A method of preparation of a cardo polyetherketone (PEK-C) structural foam material, includes the following steps:

1) performing a mould pressing on a cardo polyetherketone resin by a high-temperature vulcanizing machine to prepare a billet having a thickness of 3-10 mm;

2) placing the billet in a cavity of a preheated mould-pressing machine, introducing a supercritical fluid for a penetration and a swelling; and 3) inducing a nucleation and a foaming by controlling a pressure change of a system to form the cardo polyetherketone (PEK-C) structural foam material having a closed pore structure.

Preferably, the cardo polyetherketone resin described in the above step 1) is an amorphous structure, having a structure of formula (1):

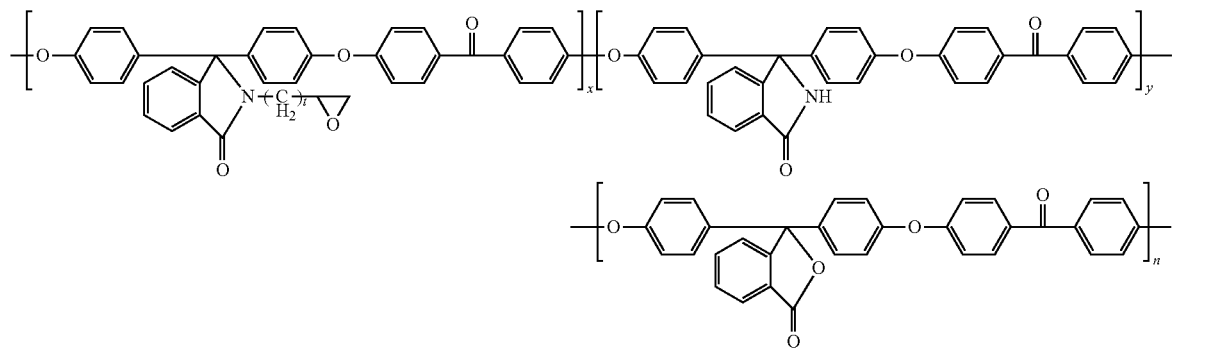

where, $1 \leq t \leq 5$; X, n are positive integers, and y is a non-negative integer.

The cardo polyetherketone resin loses 5% weight at a temperature of equal to or higher than 400° C., and loses 10% weight at a temperature of equal to or higher than 500° C.

Preferably, a viscosity of the cardo polyetherketone resin in the above step 1) ranges from 0.4 dl/g to 1.2 dl/g (the resin viscosity is measured in a 0.5% $CHCl_3$ solution at 25° C.), the most preferred viscosity ranges from 0.6 dl/g to 0.9 dl/g, and the resin has an amorphous structure.

Preferably, the cardo polyetherketone resin used in the above step 1) has a glass transition temperature ranging from 208° C. to 230° C.

Preferably, a mould-pressing process of the high-temperature vulcanizing machine described in the above step 1) includes: preheating at a temperature of 200-230° C., and compacting and discharging gas under a surface pressure of 0.1-2 MPa for 10 min; slowly increasing the temperature from 230° C. to 280° C. within heating time of 20 min, and maintaining the surface pressure of 2-3 Mpa; then performing a mould pressing at 280-295° C. with a mould-pressing pressure of 4.5-6 Mpa and mould-pressing time of 30-45 min; and finally, cooling and releasing the mould to obtain a billet having a thickness of 3-10 mm. The cardo polyetherketone resin has a poor fluidity, and using the mould-pressing process of the present invention can effectively reduce defects inside the billet, thereby reducing the defects such as bubbling, delamination and collapse of the foamed body.

Preferably, a temperature of the cavity of the mould-pressing machine in the above step 2) is 230-265° C., the supercritical fluid is supercritical $CO_2$, a pressure of the supercritical fluid is 7.5-15 MPa, and the time of the swelling and penetration is 30-180 min. Under this supercritical condition, the cardo polyetherketone resin is fully swelled to a saturated state, and then increasing the pressure or extending the time after that has little effect on the foaming effect. Considering the energy consumption and efficiency, the process is a preferable foaming condition.

Preferably, the pressure change of the system in the above step 3) ranges from 15 MPa to 0 with a pressure change rate of 75-150 MPa/s. At this pressure relief rate, the bubble nucleation is fast, and the time of the pore growth is short. A foam product having a cell size of 30-200 μm can be obtained, and the mechanical properties of the material are optimal.

In the implementation method of the above steps, the obtained cardo polyetherketone structural foam has an expansion ratio ranging from 9 to 20, a thickness ranging from 9 mm to 45 mm, and a cell size ranging from 30 μm to 200 μm.

Compared with the prior art, the advantages of the cardo polyetherketone (PEK-C) structural foam material prepared by the present invention are as follows:

1) PEK-C structural foam has the characteristics of light weight, high strength, high temperature resistance, and low temperature resistance. The PEK-C structural foam can be used for a long period at a temperature ranging from −50° C. to 200° C., which is especially suitable for fields such as aerospace, military, defense, etc.;

2) PEK-C structural foam due has the characteristics such as flame retardancy, sound insulation, thermal insulation, non-water absorption, etc., and can be applied to peripherals of ships and engine; and 3) PEK-C structural foam has the characteristics of light weight, high strength, high temperature creep resistance, and is especially suitable for aircraft industry.

DETAILED DESCRIPTION OF THE EMBODIMENTS

Figure 1:
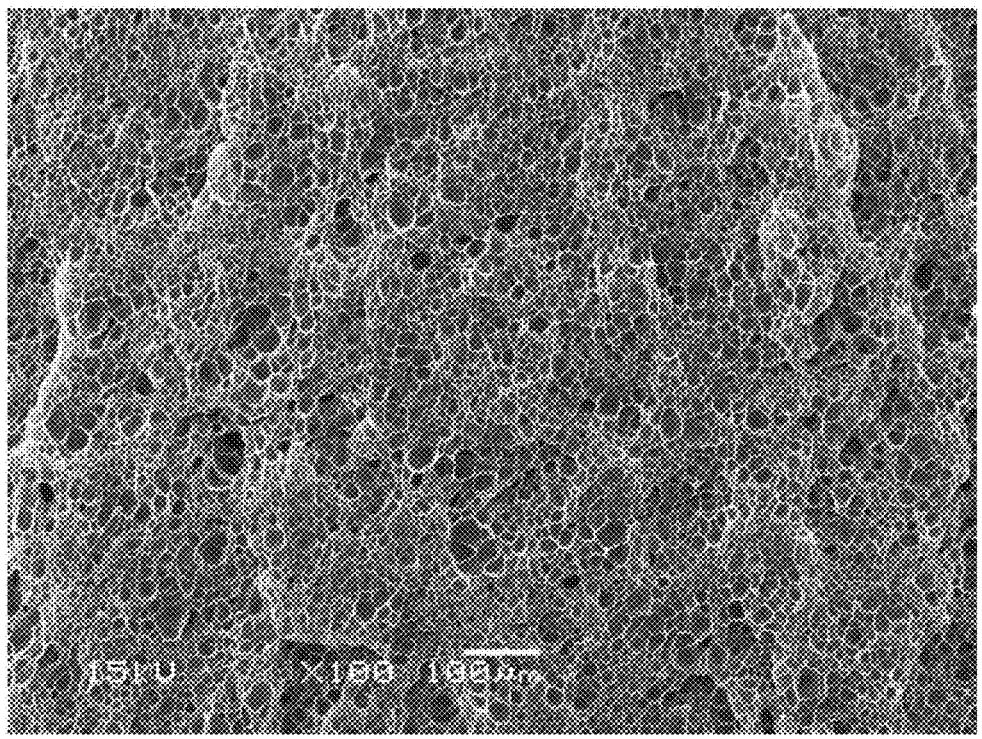
FIG. 1 is a scanning electron micrograph of a cut surface of a sample according to embodiment 1; It can be seen from the scanning electron micrograph that the cell size ranges from 20 μm to 50 μm, and the cell density ranges from $10^8$ cells/$cm^3$ to $10^{12}$ cells/$cm^3$.
Figure 2:
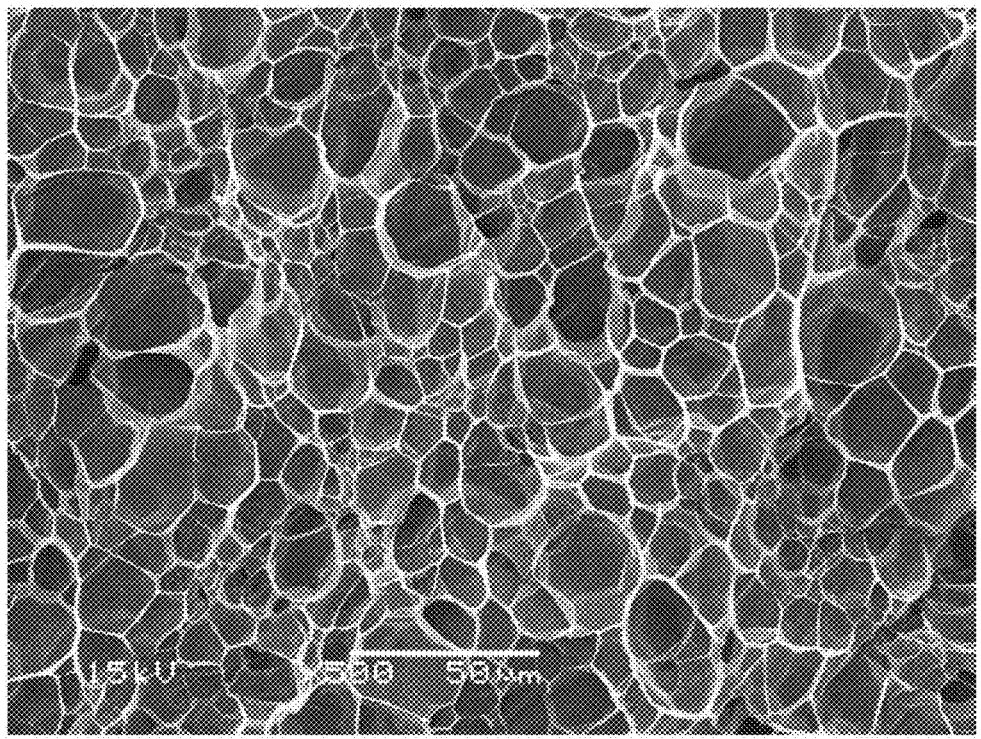
FIG. 2 is a scanning electron micrograph of a cut surface of a sample according to embodiment 3; It can be seen from the scanning electron micrograph that the cell size ranges from 80 μm to 120 μm, and the cell density ranges from $10^6$ cells/$cm^3$ to $10^8$ cells/$cm^3$.

In order to make the objective, the technical solution and the advantages of the present invention clearer and more definite, the present invention is further described in detail in combination with specific embodiments. It should be understood that these descriptions are illustrative, rather than limiting the scope of the present invention.

Embodiment 1

First, a cardo polyetherketone (PEK-C) resin from Changchun Institute of Applied Chemistry is used. A viscosity of the PEK-C resin is 0.87 dl/g (0.5% $CHCl_3$, 25° C.), and the PEK-C resin is an amorphous structure, and has a glass transition temperature ranging from 208° C. to 230° C. The PEK-C state was in a powder state with a size of less than 80 mesh, and was subjected to a mould pressing by a high-temperature vulcanizing machine to form a foaming billet.

The mould-pressing process includes: 1) preheating at a temperature of 200-230° C., and compacting and discharging gas under a surface pressure of 0.1-2 MPa for 10 min; 2) slowly increasing the temperature from 230° C. to 280° C. within the heating time of 20 min, and maintaining the surface pressure of 2-3 Mpa; 3) then performing a mould pressing at 280-295° C. with a mould-pressing pressure of 4.5-6 Mpa and mould-pressing time of 30-45 min; and 4) finally, cooling and releasing the mould to obtain a billet having a thickness of 3-10 mm.

Then, the pre-prepared PEK-C foaming billet plate (having a size of 200×200×10 mm) was placed in a foaming cavity of a mould-pressing machine, the oxygen in the foaming cavity was replaced by the high-pressure $CO_2$ gas. The mould-pressing machine was configured at a constant temperature of 265° C. A pressure of the supercritical fluid was controlled to be 15 MPa, and the time of the swelling and penetration was 3 h.

Finally, after reaching equilibrium, the pressure was relieved to 0 at a pressure relief rate of 120-150 MPa/s, and the swollen PEK-C billet plate forms a nucleus uniformly. Then, the mould-pressing machine was quickly opened, the gas nucleuses continued to grow, and a PEK-C structural foam plate material (having a size of 420×420×45 mm) was obtained. The density of the foamed plate was measured to be 65 kg/m³, and the foamed material was expanded by about 20 times compared with the raw material.

Embodiment 2

First, a cardo polyetherketone (PEK-C) resin from Changchun Institute of Applied Chemistry is used. A viscosity of the PEK-C resin is 0.68 dl/g (0.5% $CHCl_3$, 25° C.), and the PEK-C resin is an amorphous structure, and has a glass transition temperature ranging from 208° C. to 230° C. The PEK-C resin was in a powder state with a size of less than 80 mesh, and subjected to a mould pressing by a high-temperature vulcanizing machine to form a foaming billet.

The mould-pressing process includes: 1) preheating at a temperature of 200-230° C., and compacting and discharging gas under a surface pressure of 0.1-2 MPa for 10 min; 2) slowly increasing the temperature from 230° C. to 280° C. within the heating time of 20 min, and maintaining the surface pressure of 2-3 Mpa; 3) then performing a mould pressing at 280-295° C. with a mould-pressing pressure of 4.5-6 Mpa and mould-pressing time of 30-45 min; and 4) finally, cooling and releasing the mould to obtain a billet having a thickness of 3-10 mm.

Then, the pre-prepared PEK-C foaming billet plate (having a size of 200×200×6 mm) was placed in a foaming cavity of a mould-pressing machine, the oxygen in the foaming cavity was replaced by the high-pressure $CO_2$ gas. The mould-pressing machine was configured at a constant temperature of 255° C. A pressure of the supercritical fluid was controlled to be 10 MPa, and the time of the swelling and penetration was 2.5 h.

Finally, after reaching equilibrium, the pressure was relieved to 0 at a pressure relief rate of 100-120 MPa/s, and the swollen PEK-C billet plate forms a nucleus uniformly. Then, the mould-pressing machine was quickly opened, the gas nucleuses continued to grow, and a PEK-C structural foam plate material (having a size of 380×380×28 mm) was obtained. The density of the foamed plate was measured to be 75 kg/m³, and the foamed material was expanded by about 17 times compared with the raw material.

Embodiment 3

First, a cardo polyetherketone (PEK-C) resin from Changchun Institute of Applied Chemistry is used. A viscosity of the PEK-C resin is 0.61 dl/g (0.5% $CHCl_3$, 25° C.), and the PEK-C resin is an amorphous structure, and has a glass transition temperature ranging from 208° C. to 230° C. The PEK-C resin was in a powder state with a size of less than 80 mesh, and subjected to a mould pressing by a high-temperature vulcanizing machine to form a foaming billet.

The mould-pressing process includes: 1) preheating at a temperature of 200-230° C., and compacting and discharging gas under a surface pressure of 0.1-2 MPa for 10 min; 2) slowly increasing the temperature from 230° C. to 280° C. within the heating time of 20 min, and maintaining the surface pressure of 2-3 Mpa; 3) then performing a mould pressing at 280-295° C. with a mould-pressing pressure of 4.5-6 Mpa and moulding time of 30-45 min; and 4) finally, cooling and releasing the mould to obtain a billet having a thickness of 3-10 mm.

Then, the pre-prepared PEK-C foaming billet plate (having a size of 200×200×3 mm) was placed in a foaming cavity of a mould-pressing machine, the oxygen in the foaming cavity was replaced by the high-pressure $CO_2$ gas. The mould-pressing machine was configured at a constant temperature of 265° C. A pressure of the supercritical fluid was controlled to be 7.5 MPa, and the time of the swelling and penetration was 0.5 h.

Finally, after reaching equilibrium, the pressure was relieved to 0 at a pressure relief rate of 75-100 MPa/s, and the swollen PEK-C billet plate forms a nucleus uniformly. Then, the mould-pressing machine was quickly opened, the gas nucleuses continued to grow, and a PEK-C structural foam plate material (having a size of 365×365×8 mm) was obtained. The density of the foamed plate was measured to be 150 kg/m³, and the foamed material was expanded by about 9 times compared with the raw material.

The performance test was performed on the foamed materials prepared in embodiment 1 and embodiment 3. The results are shown in Table 1.

TABLE 1

Properties of Foamed Materials Prepared in Embodiment 1 and Embodiment 3

| Test item | Test condition | Unit | Embodiment 1 | Retention rate | Embodiment 3 | Retention rate |
|---|---|---|---|---|---|---|
| Density | Room temperature | $kg/m^3$ | 65.6 | 99.8% | 163 | 99.6% |
|  | 180° C. |  | 65.5 |  | 162 |  |
| Compression strength | Room temperature | MPa | 0.572 | 59.1% | 1.93 | 59.1% |
|  | 180° C. |  | 0.338 |  | 1.14 |  |
| Compression modulus | Room temperature | MPa | 30.6 | 83.0% | 103 | 84.7% |
|  | 180° C. |  | 25.4 |  | 87.2 |  |

Embodiment 4

First, a cardo polyetherketone (PEK-C) resin from Changchun Institute of Applied Chemistry is used. A viscosity of the PEK-C resin is 0.97 dl/g (0.5% $CHCl_3$, 25° C.), and the PEK-C resin is an amorphous structure, and has a glass transition temperature ranging from 208° C. to 230° C. The PEK-C resin was in a powder state with a size of less than 80 mesh, and subjected to a mould pressing by a high-temperature vulcanizing machine to form a foaming billet.

The mould-pressing process includes: 1) preheating at a temperature of 200-230° C., and compacting and discharging gas under a surface pressure of 0.1-2 MPa for 10 min; 2) slowly increasing the temperature from 230° C. to 280° C. within the heating time of 20 min, and maintaining the surface pressure of 2-3 Mpa; 3) then performing a mould pressing at 280-295° C. with a mould-pressing pressure of 4.5-6 Mpa and moulding time of 30-45 min; and 4) finally, cooling and releasing the mould to obtain a billet having a thickness of 3-10 mm.

Then, the pre-prepared PEK-C foaming billet plate (having a size of 200×200×10 mm) was placed in a foaming cavity of a mould-pressing machine, the oxygen in the foaming cavity was replaced by the high-pressure $CO_2$ gas. The mould-pressing machine was configured at a constant temperature of 230° C. A pressure of the supercritical fluid was controlled to be 15 MPa, and the time of the swelling and penetration was 3 h.

Finally, after reaching equilibrium, the pressure was relieved to 0 at a pressure relief rate of 75-120 MPa/s, and the swollen PEK-C billet plate forms a nucleus uniformly. Then, the mould-pressing machine was quickly opened, the gas nucleuses continued to grow, and a PEK-C structural foam plate material (having a size of 355×355×38 mm) was obtained. The density of the foamed plate was measured to be 110 $kg/m^3$, and the foamed material was expanded by about 12 times compared with the raw material.

Embodiment 5

First, a cardo polyetherketone (PEK-C) resin from Changchun Institute of Applied Chemistry is used. A viscosity of the PEK-C resin is 0.87 dl/g (0.5% $CHCl_3$, 25° C.), and the PEK-C resin is an amorphous structure, and has a glass transition temperature ranging from 208° C. to 230° C. The PEK-C resin was in a powder state with a size of less than 80 mesh, and subjected to a mould pressing by a high-temperature vulcanizing machine to form a foaming billet.

The mould-pressing process includes: 1) preheating at a temperature of 200-230° C., and compacting and discharging gas under a surface pressure of 0.1-2 MPa for 10 min; 2) slowly increasing the temperature from 230° C. to 280° C. within the heating time of 20 min, and maintaining the surface pressure of 2-3 Mpa; 3) then performing a mould pressing at 280-295° C. with a mould-pressing pressure of 4.5-6 Mpa and moulding time of 30-45 min; and 4) finally, cooling and releasing the mould to obtain a billet having a thickness of 3-10 mm.

Then, the pre-prepared PEK-C foaming billet plate (having a size of 200×200×6 mm) was placed in a foaming cavity of a mould-pressing machine, the oxygen in the foaming cavity was replaced by the high-pressure $CO_2$ gas. The mould-pressing machine was configured at a constant temperature of 265° C. A pressure of the supercritical fluid was controlled to be 12 MPa, and the time of the swelling and penetration was 2 h.

Finally, after reaching equilibrium, the pressure was relieved to 0 at a pressure relief rate of 120-150 MPa/s, and the swollen PEK-C billet plate forms a nucleus uniformly. Then, the mould-pressing machine was quickly opened, the gas nucleuses continued to grow, and a PEK-C structural foam plate material (having a size of 385×385×29 mm) was obtained. The density of the foamed plate was measured to be 70 $kg/m^3$, and the foamed material was expanded by about 18 times compared with the raw material.

Embodiment 6

First, a cardo polyetherketone (PEK-C) resin from Changchun Institute of Applied Chemistry is used. A viscosity of the PEK-C resin is 0.61 dl/g (0.5% $CHCl_3$, 25° C.), and the PEK-C resin is an amorphous structure, and has a glass transition temperature ranging from 208° C. to 230° C. The PEK-C resin was in a powder state with a size of less than 80 mesh, and subjected to a mould pressing by a high-temperature vulcanizing machine to form a foaming billet.

The mould-pressing process includes: 1) preheating at a temperature of 200-230° C., and compacting and discharging gas under a surface pressure of 0.1-2 MPa for 10 min; 2) slowly increasing the temperature from 230° C. to 280° C. within the heating time of 20 min, and maintaining the surface pressure of 2-3 Mpa; 3) then performing a mould pressing at 280-295° C. with a mould-pressing pressure of 4.5-6 Mpa and moulding time of 30-45 min; and 4) finally, cooling and releasing the mould to obtain a billet having a thickness of 3-10 mm.

Then, the pre-prepared PEK-C foaming billet plate (having a size of 200×200×6 mm) was placed in a foaming cavity of a mould-pressing machine, the oxygen in the foaming cavity was replaced by the high-pressure $CO_2$ gas. The mould-pressing machine was configured at a constant temperature of 265° C. A pressure of the supercritical fluid was controlled to be 15 MPa, and the time of the swelling and penetration was 3 h.

Finally, after reaching equilibrium, the pressure was relieved to 0 at a pressure relief rate of 100-120 MPa/s, and the swollen PEK-C billet plate forms a nucleus uniformly. Then, the mould-pressing machine was quickly opened, the gas nucleuses continued to grow, and a PEK-C structural foam plate material (having a size of 360×360×26 mm) was obtained. The density of the foamed plate was measured to be 90 kg/m$^3$, and the foamed material was expanded by about 14 times compared with the raw material.

The PEK-C structural foam of the present invention has the characteristics of light weight and high strength, and can be directly applied to the fields of aerospace, transportation, ship, etc. The PEK-C structural foam can be cut into various specifications of plates as a core layer of the sandwich structure material, and can further be cut into sheet materials for secondary moulding to meet the needs of different application fields.

The foam prepared by the present invention is a typical structural foam. The mechanical property of the foam prepared by the present invention is higher than that of the polyvinyl chloride (PVC) structural foam, and is close to that of the polymethacrylimide (PMI) foam. Especially, the mechanical property can be maintained at the level of MPa at a high temperature. The foam prepared by the present invention is an excellent high-temperature structural foam.

Although the embodiments of the present invention have been described in detail, it should be understood that various changes, substitutions and modifications may be made to the embodiments of the present invention without departing from the spirit and scope of the present invention.

What is claimed is:

1. A method of preparation of a cardo polyetherketone structural foam material, comprising the following steps:
   1) performing a mould pressing on a cardo polyetherketone resin by a high-temperature vulcanizing machine to prepare a billet having a thickness of 3-10 mm, wherein in step 1), multiple surface pressures ranging from 0.1 MPa to 3 MPa are applied before the mould pressing is performed;
   2) placing the billet in a cavity of a preheated mould-pressing machine, and introducing a supercritical fluid for a penetration and a swelling; and
   3) inducing a nucleation and a foaming by controlling a pressure change to form the cardo polyetherketone structural foam material having a closed pore structure.

2. The method of preparation of the cardo polyetherketone structural foam material of claim 1, wherein, the cardo polyetherketone resin in the step 1) is an amorphous structure having a structure of formula (1):

the cardo polyetherketone resin loses 5% by weight at a temperature of equal to or higher than 400° C., and loses 10% by weight at a temperature of equal to or higher than 500° C.

3. The method of preparation of the cardo polyetherketone structural foam material of claim 1, wherein, a viscosity of the cardo polyetherketone resin in the step 1) ranges from 0.4 dl/g to 1.2 dl/g.

4. The method of preparation of the cardo polyetherketone structural foam material of claim 1, wherein, a viscosity of the cardo polyetherketone resin in the step 1) ranges from 0.6 dl/g to 0.9 dl/g.

5. The method of preparation of the cardo polyetherketone structural foam material of claim 1, wherein, the cardo polyetherketone resin in the step 1) has a glass transition temperature ranging from 208° C. to 230° C.

6. The method of preparation of the cardo polyetherketone structural foam material of claim 1, wherein, a process of the mould pressing in the step 1) comprises:
   preheating at a temperature of 200-230° C., and compacting and discharging gas under a first surface pressure of 0.1-2 MPa for 10 min;
   slowly increasing the temperature from 230° C. to 280° C. within a heating time of 20 min, with a second surface pressure of 2-3 MPa during the heating time;
   then, performing the mould pressing at 280-295° C. with a mould-pressing pressure of 4.5-6 MPa and a moulding time of 30-45 min; and
   finally, cooling and releasing from the mould to obtain the billet having the thickness of 3-10 mm.

7. The method of preparation of the cardo polyetherketone structural foam material of claim 1, wherein, a temperature inside the cavity of the mould-pressing machine in the step 2) is 230-265° C., the supercritical fluid is supercritical $CO_2$, a pressure of the supercritical fluid is 7.5-15 MPa, and a duration of the swelling and penetration is 30-180 min.

8. The method of preparation of the cardo polyetherketone structural foam material of claim 1, wherein, the pressure change in the step 3) ranges up to 15 MPa, and a pressure change rate is 75-150 MPa/s.

9. The method of preparation of the cardo polyetherketone structural foam material of claim 2, wherein, a viscosity of the cardo polyetherketone resin in the step 1) ranges from 0.4 dl/g to 1.2 dl/g.

10. The method of preparation of the cardo polyetherketone structural foam material of claim 2, wherein, a viscosity of the cardo polyetherketone resin in the step 1) ranges from 0.6 dl/g to 0.9 dl/g.

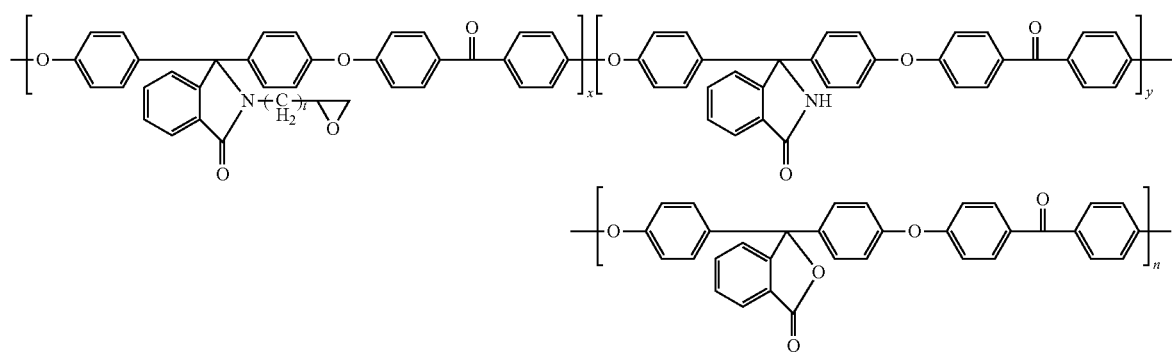

(1)

wherein, $1 \leq t \leq 5$; X, n are positive integers, and y is a non-negative integer; and 11. The method of preparation of the cardo polyetherketone structural foam material of claim 2, wherein, the cardo polyetherketone resin in the step 1) has a glass transition temperature ranging from 208° C. to 230° C.

* * * * *